No. 683,380. Patented Sept. 24, 1901.
P. F. CASSIDY.
OBSTETRICAL APPLIANCE.
(Application filed Apr. 6, 1901.)
(No Model.)
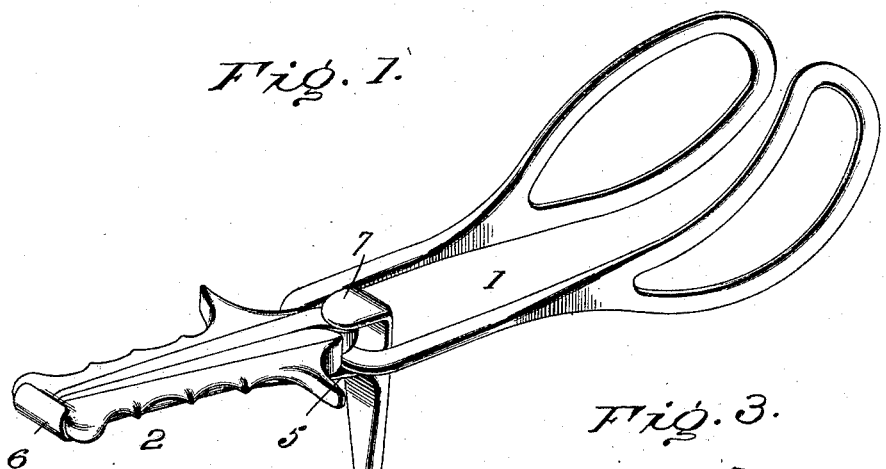
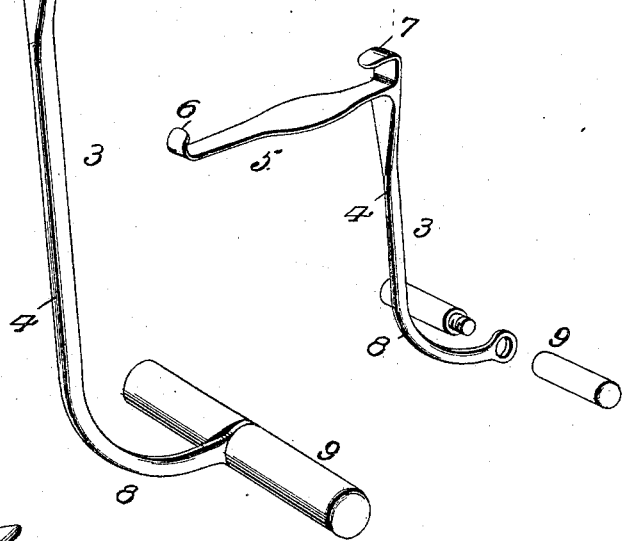
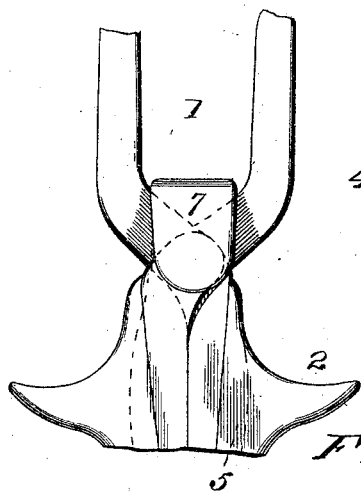
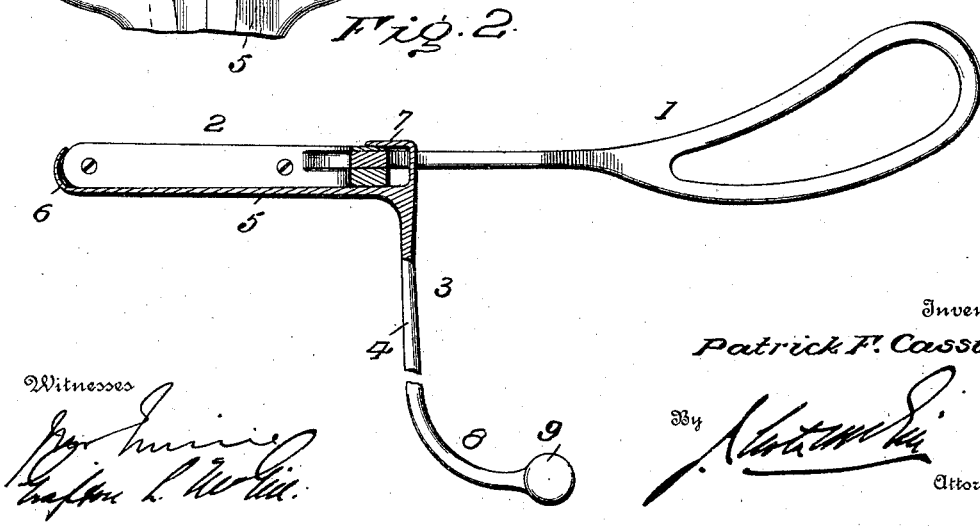
Inventor
Patrick F. Cassidy
Witnesses
By
Attorney

UNITED STATES PATENT OFFICE.

PATRICK F. CASSIDY, OF BOSTON, MASSACHUSETTS, ASSIGNOR TO BOSTON BOTTLE WIRING AND LABELING COMPANY, OF SAME PLACE.

OBSTETRICAL APPLIANCE.

SPECIFICATION forming part of Letters Patent No. 683,380, dated September 24, 1901.

Application filed April 6, 1901. Serial No. 54,661. (No model.)

*To all whom it may concern:*

Be it known that I, PATRICK F. CASSIDY, of Boston, in the county of Suffolk and State of Massachusetts, have invented certain new and useful Improvements in Obstetrical Appliances; and I do hereby declare the following to be a full, clear, and exact description of the invention, such as will enable others skilled in the art to which it appertains to make and use the same.

This invention relates to obstetrical appliances, having special reference to forceps for axis-traction. As heretofore constructed, these devices have employed tractors attached to the cephalic portions of the blades either by cords or pivotal connections, the tractor being extended back adjacent the handle of the instrument. Practice has demonstrated that these tractors do not effect the proper downward movement of the blades, which is necessary in the use of the instrument, and that the employment of cords and pivotal connections is attended with very great danger on account of the liability of septic matter to collect in small crevices.

The object of my invention is to provide a tractor which may readily be used on any forceps and attached thereto without the use of pivot-pins or cords and by which the desired axial force will be exerted upon the blades.

The invention will be hereinafter fully set forth, and particularly pointed out in the claims.

In the accompanying drawings, Figure 1 is a view of a pair of forceps with my improved tractor attached. Fig. 2 is a sectional view longitudinal through the handle portion of the forceps. Fig. 3 is a view of the tractor. Fig. 4 is a plan view showing the attachment of the tractor over the inner ends of the handles.

Referring to the drawings, 1 designates a pair of obstetrical forceps (the form shown being the well-known Simpson device) equipped with handles 2, at the forward end of which the two members have a pivotal action or connection.

3 is the tractor. It is shown in the form of a single piece of steel bent to form a rigid bar 4, extending at substantially right angles to the forceps. Near the upper end of the bar 4 is a laterally-projecting arm 5, the length of which about equals that of the handles of the forceps. At its outer end this arm is curved upwardly to form a hook 6 for engaging the outer ends of the handles. Above the inner end of arm 5 bar 4 is bent to form a right-angular hook 7 for engaging the handles of the forceps at their inner ends. When hooks 6 and 7 are placed in engagement with the handles, the tractor is firmly secured to the forceps and the latter are free to be operated without interference. The lower end of the depending bar 4 is curved forwardly at 8—that is, it is bent in the opposite direction to arm 5 and terminates in a handle 9, the parts of which may be screwed on to permit of their removal for cleansing purposes.

In practice the tractor is attached by placing the hooks 7 between the forks of the forceps and over their pivotal connection, after which it is turned so that the upwardly-curved hook 6 will engage the outer ends of the handles.

The advantages of my invention are apparent to medical practitioners. When the tractor is attached to the forceps, the handle of the latter may be held in one hand and that of the tractor in the other. The force applied at the handle of the tractor will insure an axial movement of the instrument and the consequent downward movement of the cephalic portions of the blades. It will be noted that the lateral arm 5 communicates a positive action, and the instrument being entirely free of all pivot-pins or cords the danger arising from the collection of septic matter is entirely avoided and the parts may be readily disconnected for sterilizing purposes.

Although I have shown my improvement applied to a pair of Simpson forceps, yet it is obvious that it may be applied to any other device, and for this reason I prefer to make the tractors in different sizes to accommodate various styles rather than to provide any adjusting means in which septic matter would have a tendency to collect.

I claim as my invention—

1. The combination with a pair of forceps, of a tractor comprising a rigid bar extending at substantially right angles to the forceps at the inner end of the handle, and provided with means for fixedly engaging such handle at the ends thereof.

2. The combination with a pair of forceps, of a rigid tractor having two rigid hooks for engaging the forceps at two points.

3. The combination with a pair of forceps, of a rigid tractor comprising a depending bar, an arm extending therefrom and hooks at the ends of said arm for engaging the inner and outer ends of the handles of the forceps, as set forth.

4. The combination with a pair of forceps, of a tractor having hooks engaging such forceps at the outer and inner ends of the handles, and a bar extending at substantially right angles from the forceps at the point of engagement of said tractor with the inner end of the handle.

In testimony whereof I have signed this specification in the presence of two subscribing witnesses.

PATRICK F. CASSIDY.

Witnesses:
ELIZABETH R. PORTER,
GEORGE A. FLYNN.